US010567155B2

(12) United States Patent
Medwed et al.

(10) Patent No.: US 10,567,155 B2
(45) Date of Patent: Feb. 18, 2020

(54) SECURING A CRYPTOGRAPHIC DEVICE

(71) Applicant: NXP B.V., Eindhoven (NL)

(72) Inventors: Marcel Medwed, Gratkorn (AT);
Ventzislav Nikov, Heverlee (BE);
Martin Feldhofer, Gratkorn (AT)

(73) Assignee: NXP B.V., Eindhoven (NL)

( * ) Notice: Subject to any disclaimer, the term of this patent is extended or adjusted under 35 U.S.C. 154(b) by 219 days.

(21) Appl. No.: 15/143,259

(22) Filed: Apr. 29, 2016

(65) Prior Publication Data
US 2016/0323097 A1 Nov. 3, 2016

(30) Foreign Application Priority Data

Apr. 30, 2015 (EP) ..................... 15166086

(51) Int. Cl.
*H04L 9/00* (2006.01)
*H04L 9/08* (2006.01)
(Continued)

(52) U.S. Cl.
CPC .............. *H04L 9/002* (2013.01); *G06F 7/582* (2013.01); *H04L 9/003* (2013.01); *H04L 9/0662* (2013.01); *H04L 9/0869* (2013.01); *H04L 9/0891* (2013.01); *H04L 63/0457* (2013.01); *H04L 63/08* (2013.01); *H04L 63/123* (2013.01)

(58) Field of Classification Search
CPC ......... G06F 7/582; H04L 9/002; H04L 9/003; H04L 9/0662; H04L 9/0869; H04L 9/0891; H04L 63/0457; H04L 63/08
See application file for complete search history.

(56) References Cited

U.S. PATENT DOCUMENTS 5,687,237 A 11/1997 Naclerio
6,539,092 B1 3/2003 Kocher
(Continued)

FOREIGN PATENT DOCUMENTS

EP 2 996 277 A1 3/2016
JP WO 2015145964 A1 * 10/2015 ........... H04L 9/0625

OTHER PUBLICATIONS

D. Horan and R. Guinee, "A Novel Stream Cipher for Cryptographic Applications," MILCOM 2006-2006 IEEE Military Communications conference, Washington, DC, 2006, pp. 1-5. (Year: 2006).*

(Continued)

*Primary Examiner* — Jung W Kim
*Assistant Examiner* — Sameera Wickramasuriya

(57) ABSTRACT

Methods of securing a cryptographic device against implementation attacks are described. A disclosed method comprises the steps of: generating secret values (324) using a pseudorandom generator (510); providing a key (330), an input (324) having a number of chunks and the secret values to an encryption module (340); indexing the chunks and the secret values (324); processing the input chunk wise by encrypting the secret values (324) indexed by the chunks using the key (330) and the encryption module (340); generating for each chunk a pseudorandom output (330') of the encryption module (340), providing the pseudorandom output as the key (330') when processing the next chunk; and performing a final transformation on the last pseudorandom output (330') from the previous step by using it as a key to encrypt a fixed plaintext.

20 Claims, 7 Drawing Sheets

(51) Int. Cl.
*G06F 7/58* (2006.01)
*H04L 29/06* (2006.01)
*H04L 9/06* (2006.01)

(56) References Cited

U.S. PATENT DOCUMENTS

| | | | | |
|---|---|---|---|---|
| 7,809,141 | B2* | 10/2010 | Daemen | G06F 12/1408 |
| | | | | 380/264 |
| 8,386,800 | B2* | 2/2013 | Kocher | G06F 21/602 |
| | | | | 713/189 |
| 9,961,057 | B2 | 5/2018 | Medwed et al. | |
| 2001/0002486 | A1* | 5/2001 | Kocher | G06F 7/723 |
| | | | | 713/171 |
| 2001/0021253 | A1* | 9/2001 | Furuya | H04L 9/0625 |
| | | | | 380/259 |
| 2009/0080647 | A1* | 3/2009 | Mantin | H04L 9/0637 |
| | | | | 380/29 |
| 2009/0323927 | A1 | 12/2009 | Schneider | |
| 2010/0002868 | A1* | 1/2010 | Willoughby | H04L 9/0637 |
| | | | | 380/28 |
| 2010/0316217 | A1* | 12/2010 | Gammel | H04L 9/0668 |
| | | | | 380/44 |
| 2011/0243320 | A1* | 10/2011 | Halevi | H04L 9/008 |
| | | | | 380/30 |
| 2012/0278635 | A1* | 11/2012 | Hars | G06F 12/14 |
| | | | | 713/193 |
| 2013/0073850 | A1* | 3/2013 | Zaverucha | H04L 9/0869 |
| | | | | 713/168 |
| 2016/0019386 | A1* | 1/2016 | Duplys | G06F 21/55 |
| | | | | 713/191 |
| 2017/0118011 | A1* | 4/2017 | Shibutani | H04L 9/0625 |

OTHER PUBLICATIONS

M. Z. Rahaman and M. A. Hossain, "Side channel attack prevention for AES smart card," 2008 11th International Conference on Computer and Information Technology, Khulna, 2008, pp. 376-380. (Year: 2008).*

Menezes, A. et al. "Handbook of Applied Cryptography—Chapter 7: Block Ciphers", CRC Press Series on Discrete Mathematics and its Applications, CRC Press, pp. 223-282, retrieved from the internet at: http://www.cacr.math.uwaterloo.ca/hac/ (Oct. 1, 1996).

Abdalla, M. et al. "Leakage-Resilient Symmetric Encryption via Re-keying", Cryptographic Hardware and Embedded Systems—CHES 2013, vol. 8086 of the series Lecture Notes in Computer Science, pp. 471-488 (2013).

Abdalla, M. et al. "Increasing the Lifetime of a Key: A Comparative Analysis of the Security of Re-keying Techniques", Advances in Crytology—ASIACRYPT 2000, vol. 1976 of the series Lecture Notes in Computer Science, pp. 546-559 (Oct. 27, 2000).

Extended European Search Report for Patent Appln. No. 15166086.7 (dated Sep. 30, 2015).

Medwed, M. et al. "Towards Super-Exponential Side-Channel Security with Efficient Leakage-Resilient PRFs", 20 pgs, Cryptographic Hardware and Embedded Systems—CHES 2012 vol. 7428 of the series Lecture Notes in Computer Science, retrieved from the internet at: http://www.iacr.org/archive/ches2012/74280191/74280191. pdf. (2012).

* cited by examiner

SECURING A CRYPTOGRAPHIC DEVICE

CROSS-REFERENCE TO RELATED APPLICATIONS

This application claims the priority under 35 U.S.C. § 119 of European patent application no. 15166086.7, filed on Apr. 30, 2015, the contents of which are incorporated by reference herein.

FIELD

The present disclosure relates to securing a cryptographic device. More particularly, a method for securing a cryptographic device with an encryption module against implementation attacks is disclosed. Associated systems for providing a secure communication or authenticated communication of data between a client device and a host device are also disclosed, as is an integrated circuit.

BACKGROUND

Smart devices, in particular those with low power requirements, typically called passive smart devices, are widely used for authentication and access control. Examples of such devices include contactless smart cards, which are a subset of radio-frequency identification (RFID) tags. Such passive smart devices typically use an application specific integrated circuit (ASIC).

Given the application of passive smart devices in security critical applications, cryptography is used to authenticate the passive smart device on use. Conversely, due to the desirability of the information that a passive smart device may hold or allow access to, they are also the focus of malicious attempted use.

A lot of time and effort is spent in implementation and analysis of side-channel countermeasures within security integrated circuits (ICs) like smartcards. A side-channel attack is any attack based on information gained from the physical information of a cryptographic system. Such attacks are different from a software brute force attack or an exploit or weakness in the encryption algorithms. Side-channel attacks typically examine the internal operation of the system, such as the power drawn by the system, electromagnetic (EM) emissions or other 'side-channels' to determine patterns and implementation steps. One such known side-channel attack is differential power analysis (DPA). This may involve a malicious user studying traces of power usage during use of the device and, utilising statistical analysis, determining features of the encryption algorithms.

With the use of currently available standardized algorithms and protocols, like the ones used in banking or e-government applications, attack scenarios for differential power analysis (DPA) (and differential fault attacks) are available, leading to devices implementing such protocols being threatened by such side-channel attacks (for example, because a varying input is always encrypted with the same (master) key, variations in the power signature of a system are solely or generally dependent on variations in the encryption algorithm).

A relatively new area of research is leakage resilient cryptography. In leakage resilience (LR), it is sought to avoid having the typical DPA scenario where it is possible to attack the key of a block cipher chunk-wise (i.e. in chunks, such as byte by byte) with a varying input for every execution. In the LR approach the block cipher is executed multiple times where the complete input vector is only used chunk-wise (e.g. 1 bit at a time) and copied to the whole input state of the block cipher. In every iteration the next input chunk is used as the input (again copied to the whole state). This limits the data-complexity, i.e. the number of traces which can be used for an attack, and creates a dependency between the side-channel information of the different key chunks. However, an adversary can still apply a DPA attack due to the N>1 traces available per key.

One solution to such attacks uses a method of re-keying. In such a method, a session key is derived from the master key, where subsequently this session key is used for the actual operation. This session key is changed regularly in order to decrease the amount of power traces that can be obtained from the device for a specific (master) key.

A special instance of this re-keying has been applied within the CIPURSE protocol. In this approach the master key is used to derive an intermediate session key by using a random input and a function (called NLM (non-leaking map)) that is easier to protect against implementation attacks. This intermediate session key is then used together with the master key to get to the used session key. The above solution to such DPA attacks relies on a random number agreement between the two parties. Such an approach prevents verification of previous transactions. In particular, it is not possible to repeat the sessions without the random numbers. Such an approach relies on reliable pseudorandom numbers, known as PRG's. A complimentary approach utilizes pseudorandom function families, known as PRF's, developed from PRGs such as the GGM PRF originally developed by Goldreich, Goldwasser, and Micali. The present disclosure relates to this area of protection against side-channel attacks.

SUMMARY

According to a first aspect of the present invention there is provided a method for securing a cryptographic device with an encryption module against implementation attacks, the method comprising: generating secret values using a pseudorandom generator; providing a key, an input having a number of chunks and the secret values to an encryption module; indexing the chunks and the secret values; processing the input chunk wise by encrypting the secret values indexed by the chunks using the key and the encryption module; generating for each chunk a pseudorandom output of the encryption module providing the pseudorandom output as the key when processing the next chunk; and performing a final transformation on the last pseudorandom output from the previous step by using it as a key to encrypt a fixed plaintext.

The input chunks are processed such that a chunk identifies a secret value which is then encrypted under the key using the encryption module. The output then represents the key under which the secret value corresponding to the next input chunk is encrypted using the encryption module. The output of processing the last input chunk is then subject to a final transformation where a fixed constant is encrypted under the output of the last encryption using the encryption module. All three steps together provide a leakage resilient PRF construction.

The present method ensures that a key is only used together with either a fixed single plaintext or with several unknown or secret plaintexts. This reduces the attack scenario to either simple power analysis (SPA) or unknown input DPA. Any kind of classical known input DPA is not applicable. Furthermore, also differential fault analysis attacks (DFA) attacks are rendered inefficient. The encryption module may be a standard block cipher like AES, PRESENT or any other block cipher typically vulnerable to side channel attacks.

The PRF may be considered to be a GGM-like k-ary tree construction. Within this tree construction the underlying PRG may be a block cipher in counter mode where the counter values are the unknown secret values.

In one or more embodiments, the provided key to the encryption module can be generated in the same way or manner as the generation of the secret values. Alternatively, the key may be provided from a memory of the encryption device or from an external device.

In embodiments, the pseudorandom generator may be used to generate the secret values and the generated key such that each key is only used with a single value in the encryption module.

In one or more embodiments, during the chunk wise processing of the input, only unknown values for the key and the secret values to the encryption module are processed.

In embodiments, the key used in the final transformation is only used together with a single fixed plaintext. This decreases the number of power traces available for detection from a specific key.

In embodiments, processing the input chunk wise may comprise the step of: processing a first secret value indexed by the first chunk of the input using the key to derive a first pseudorandom output. In such embodiments, the method may further comprise the steps of deriving an updated key based on the first pseudorandom output; and processing a second secret value indexed by the second chunk of the input using the updated key to derive a second pseudorandom output. More generally, the input may comprise l number of chinks, such that the method may further comprise the steps of: deriving a $(l-1)^{th}$ updated key based on the $(l-1)^{th}$ pseudorandom output; and processing a $l^{th}$ chunk using the $(l-1)^{th}$ updated key and a secret value indexed by the $l^{th}$ chunk to derive a $l^{th}$ number pseudorandom output. The $l^{th}$ pseudorandom output may then be used to encrypt a fixed secret or public constant to derive the final output. The final output may correspond to the last pseudorandom output defined above.

In embodiments the step of generating the secret values and a key may comprise the steps of: obtaining an encryption key such as from a memory of the cryptographic device; providing the encryption key and a constant input to the or an encryption module having an encryption primitive; encrypting the constant input with the value of the encryption key using the encryption primitive to generate an encryption output a secret intermediate value. This secret intermediate value is combined, such as by XORing it with the key input (i.e. the encryption key) to the encryption module to form a secret value; the secret intermediate value may then be used as or to update a or the key input to the encryption module in order to produce a further secret value in the same manner. Generating the key may be done following the same procedure. That is, the last secret value takes the role of the generated key for the step when the first input chunk is processed using the secret values and the generated key.

In embodiments the preceding steps may be iterated k+1 times to obtain a set of (k+1) number of secret values and a key, wherein the key is based on the $(k+1)^{th}$ secret value.

As noted above the encryption module may be a block cipher with an encryption primitive according to any encryption algorithm, such as the PRESENT algorithm, or the Advanced Encryption Standard algorithm.

In embodiments the set of secret values may be enlarged or post-processed using linear combinations or other means to obtain a larger set of secret values.

In some or all the embodiments, the key may be generated based on a master key supplied to the pseudorandom generator.

According to a second aspect there is provided a system for secure communication of data between a client device and a host device, said system comprising: a host device with a host microprocessor and host memory wherein the host device comprises a master key stored within the host memory and a pseudorandom generator; a client device with a client microprocessor and client memory wherein the client device comprises an encryption module; a secure connection between the host device and the client device; wherein the client device is configured to derive a pseudorandom function family from pseudorandom outputs generated using any of the methods of the first aspect; and is also configured to use said pseudorandom function family for encrypting communication between the client device and the host device by using the output as a key stream In a related aspect there may be provided a method of providing a secure communication of data between a client device and a host device, said method comprising: providing a host device with a host microprocessor and host memory wherein the host device comprises a master key stored within the host memory and a pseudorandom generator; providing a client device with a client microprocessor and client memory wherein the client device comprises an encryption module; establishing a secure connection between the host device and the client device; deriving a pseudorandom function family from the pseudorandom outputs generated using any method of the first aspect; and using said pseudorandom function family for encrypting communication between the client device and the host device by using the output as a key stream.

According to a third aspect, there is provided a system for providing authenticated communication of data between a client device and a host device, said system comprising: a host device with a host microprocessor and host memory wherein the host device comprises a master key stored within the host memory and a pseudorandom generator; a client device with a client microprocessor and client memory wherein the client device comprises an encryption module; an authenticated connection between the host device and the client device; wherein the client device is configured to derive a pseudorandom function family from pseudorandom outputs generated using any method of the first aspect; and is also configured to use said pseudorandom function family for authenticating communication between the client device and the host device by using the output as a message authentication code.

According to a related aspect there may be provided a method of providing an authenticated communication of data between a client device and a host device, said method comprising: providing a host device with a host microprocessor and host memory wherein the host device comprises a master key stored within the host memory and a pseudorandom generator; providing a client device with a client microprocessor and client memory wherein the client device comprises an encryption module; establishing an authenticated connection between the host device and the client device; deriving a pseudorandom function family from the pseudorandom outputs generated using any method of the first aspect; and using said pseudorandom function family for authenticating data communicated between the client device and the host device by using the described method for generating a message authentication code.

According to a fourth aspect there is provided an integrated circuit for a cryptographic device comprising a microprocessor and memory, wherein the device comprises a key stored within the memory, an encryption module and a pseudorandom generator, whereby the integrated circuit is configured to perform the method of any preceding aspect.

There may be provided a computer program, which when run on a computer, causes the computer to configure any apparatus, including a circuit, controller, sensor, filter, or device disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software implementation may be an assembly program.

The computer program may be provided on a computer readable medium, which may be a physical computer readable medium, such as a disc or a memory device, or may be embodied as a transient signal. Such a transient signal may be a network download, including an internet download.

These and other aspects of the invention will be apparent from, and elucidated with reference to, the embodiments described hereinafter.

BRIEF DESCRIPTION OF DRAWINGS

Embodiments will be described, by way of example only, with reference to the drawings, in which.

Figure 1:
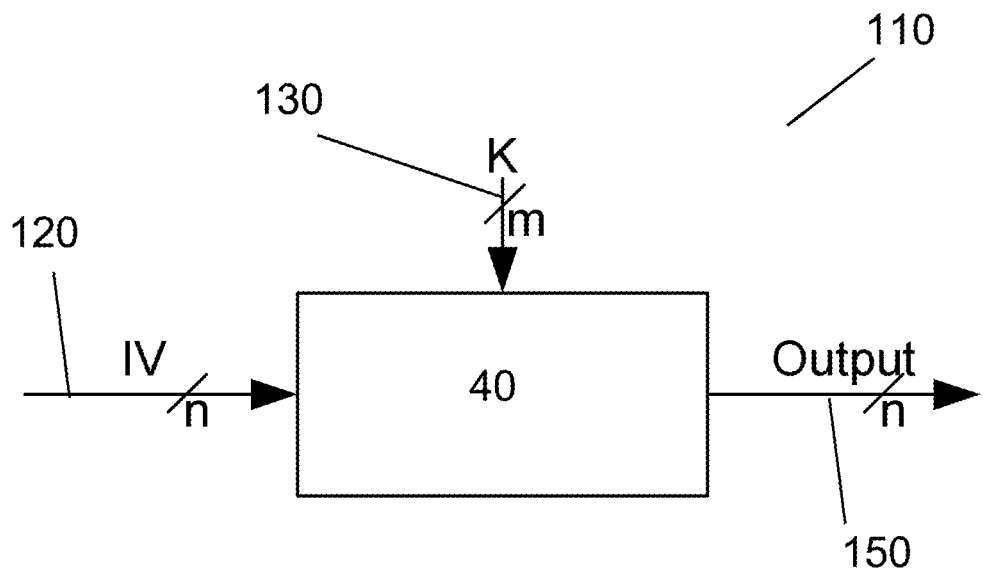
FIG. 1 illustrates a prior art cryptographic construction.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar feature in modified and different embodiments.

DETAILED DESCRIPTION OF EMBODIMENTS

FIG. 1 shows a prior art security service 110 with an input IV (input vector) 120, key (K) 130, block cipher 140 and output 150. The operation of such a prior art security service is that the input vector 120 is encrypted using the key 130 to provide an encrypted cipher text or output 150. The block cipher 140 provides instructions of how to encrypt the input using the key.

One attack method for such prior art services is to examine the internal code, e.g. the S-box, of the block cipher. One method for doing this is using side-channel attacks. For example, by analysing the electromagnetic power consumption and utilising statistics, it is possible to determine the structure of the S-box. Such attacks are often called differential power analysis attacks.

Security services such as the one shown in FIG. 1 may be employed on servers or hosts, for example a computer or a proximity coupling device, that is used to read and communicate with passive devices such as radio-frequency identification (RFID) tags.

Figure 2:
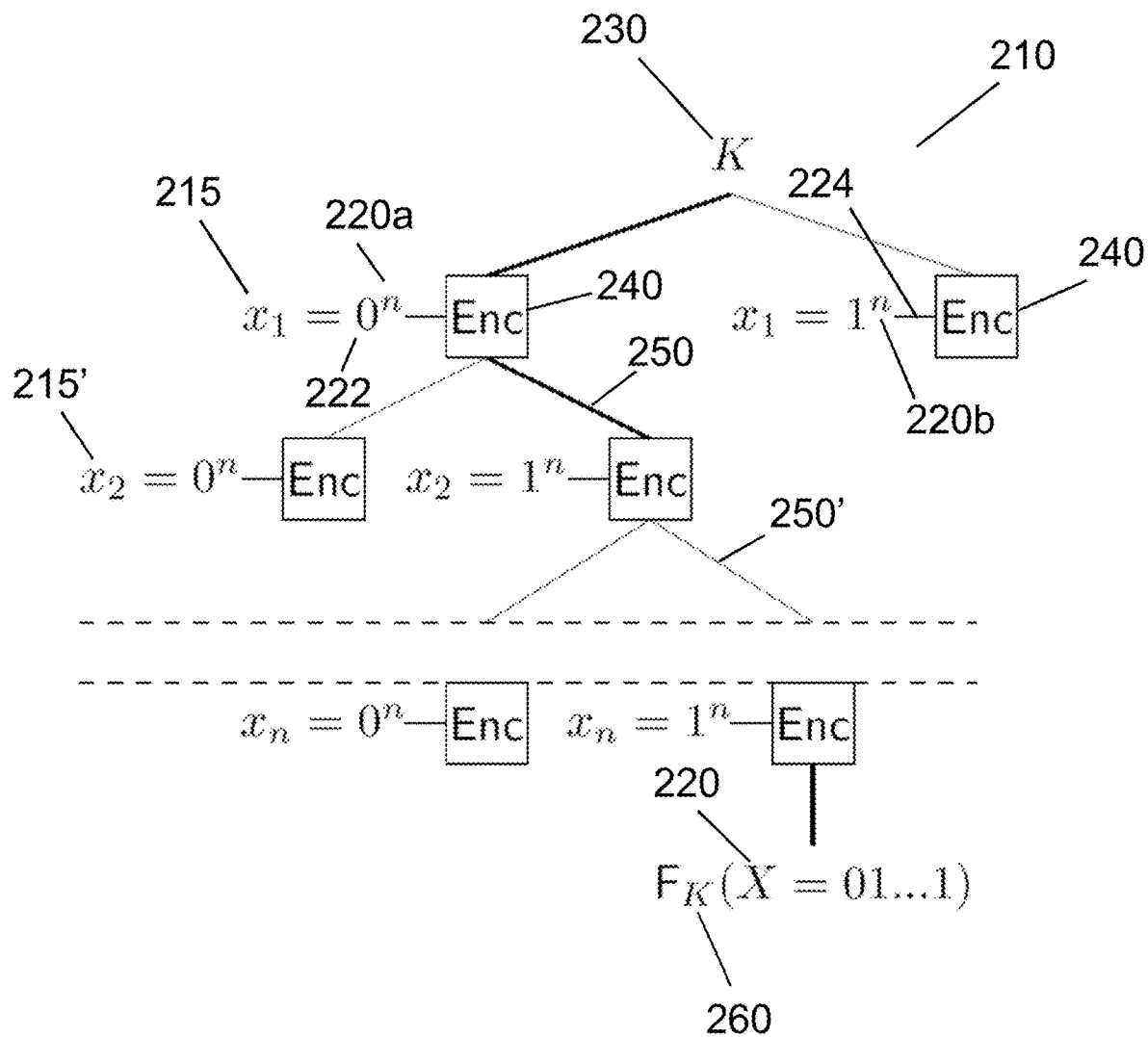
FIG. 2 illustrates a prior art pseudorandom function family binary tree construction.

FIG. 2 shows an alternative security service 210, known as a GGM construction. In this service 210, a pseudorandom function family, known as PRF, is constructed using a length-doubling pseudorandom generator, known as PRG, and a binary tree.

In particular, for the example shown in FIG. 2 of a PRF using a PRG, a key 230 is supplied to an encryption module, such as a block cipher 240 together with an input value 222. In the example shown, the input value may be either 0 or 1 and is determined by the value of an input 220. The input 220 comprises a series of input values 222 to be processed by the PRF using the PRG.

Each input value 222 of the input provides a corresponding plaintext $x_1$ 215. The plaintext 215 is equal to the input value 222 padded in some way to the plaintext input length n of the encryption module. In FIG. 210 this is done by simply repeating the value 222 n times. In the example shown, the block cipher 240 is operated in counter mode where the counter takes either the value of the all zero vector 222 or the all one vector 224.

For the first input 215, a counter value of 0 is used and the key 230 is provided to the block cipher 240. The output 250 of the encryption module or block cipher 240 for the first input 215 or iteration is then used as the key 230 for processing of the second input $x_2$ 215'. For the second input 215', a counter value of 1 is used, again repeated n times. Generalising, each output 250 provides a pseudorandom number, i.e. each node acts as a PRG and the currently processed input bit determines which branch to take next. Combining the outputs generated from the input 220 allows a function 260 for the series of outputs 215 for each input value 222 to be derived.

As a result, the tree has a depth of n and in each node (i.e. each iteration of the PRG) the key 230 is used at most twice. This can be seen in FIG. 2. Therefore, an adversary faces a scenario with a data complexity of two.

Figure 3:
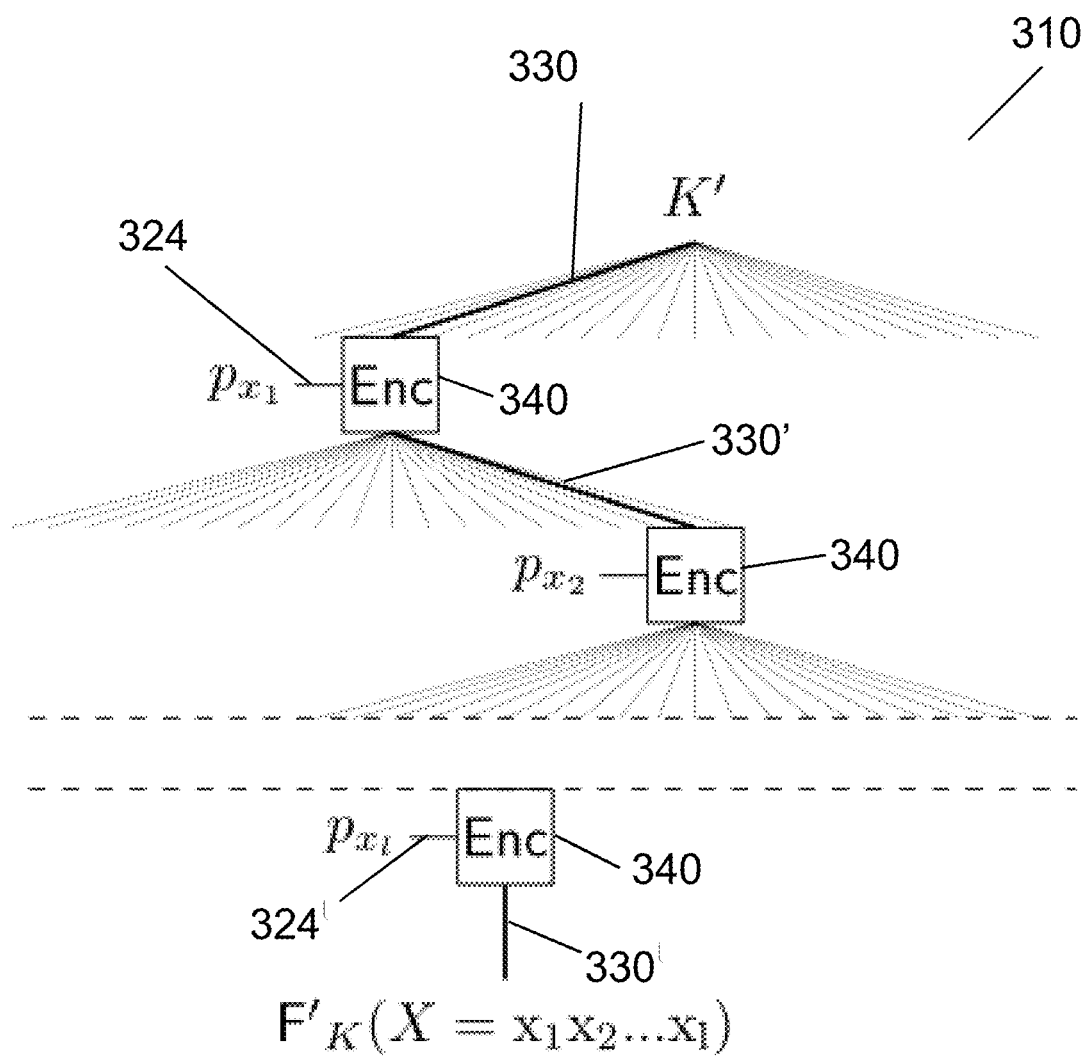
FIG. 3 illustrates a k-ary pseudorandom function family tree construction according to embodiments of the present disclosure.

In practice, a depth of n can be regarded as too costly, which leads to a k-ary tree construction. This reduces the depth of the tree to $l=n/\log_2(k)$ where k is considered to be a power of two. FIG. 3 shows an exemplary k-ary tree construction 310 used in the present disclosure. In the example shown, a key, K', 330 is provided to an encryption module, Enc, 340, as well as a secret value 324.

The key 330 as well as the k secret values may be generated using a PRG as described with reference to FIG. 5 described below. It may be appreciated that other techniques to generate a key may be used. The key 330 should be a session or updated key based on a master key. However, also other techniques to generate a set of secret values can be thought of. For instance the PRG from FIG. 5 can be used to generate a vector space basis of dimension $\log_2(k)$ which is then used to generate the k secret values by means of linear combination. Alternatively, the set of secret values 324 may be obtained from a memory of 432, 446, of either the host or client device (see below), depending upon the security protocol selected.

In addition to the key 330, and the secret values, a public input X 324 comprises an IV (initialization vector) having a n-bit length. This input X is provided to the construction chunk wise (i.e. if the tree is k-ary, X is split into l chunks $x\_1, x\_2, \ldots, x\_i, \ldots, x\_l$ of size k bits each) and each chunk is used to select the secret value $p\_x\_i$ used in the i^th level of the tree as input to the encryption module 340.

Once the first branch of the construction 310 is undertaken, the next secret value identified by the next chunk of the input X is provided to the encryption module 340. The key is updated based on the output 330'. Accordingly, unlike the example shown in FIG. 2, in FIG. 3 all input to the encryption module are secret which provides robust protection against side-channel attacks.

Generalising, the $l^{th}$ output $330^l$ is the encrypted output of the $l^{th}$ secret value $324'$ encrypted with the $(l-1)^{th}$ output as the key by the encryption module 340. This provides the pre-final result $F'_K(X=x_1 x_2 \ldots x_l)$ where X is the value of the input.

The final result $F_K(X=x_1 x_2 \ldots x_l)$ is obtained by using the pre-final result $F'_K(X=x_1 x_2 \ldots x_l)$ as a key for encrypting a fixed value or plaintext, for instance $p\_1$. This last step ensures that an adversary cannot obtain several outputs which correspond to several encryptions carried out with the same key.

Figure 4:
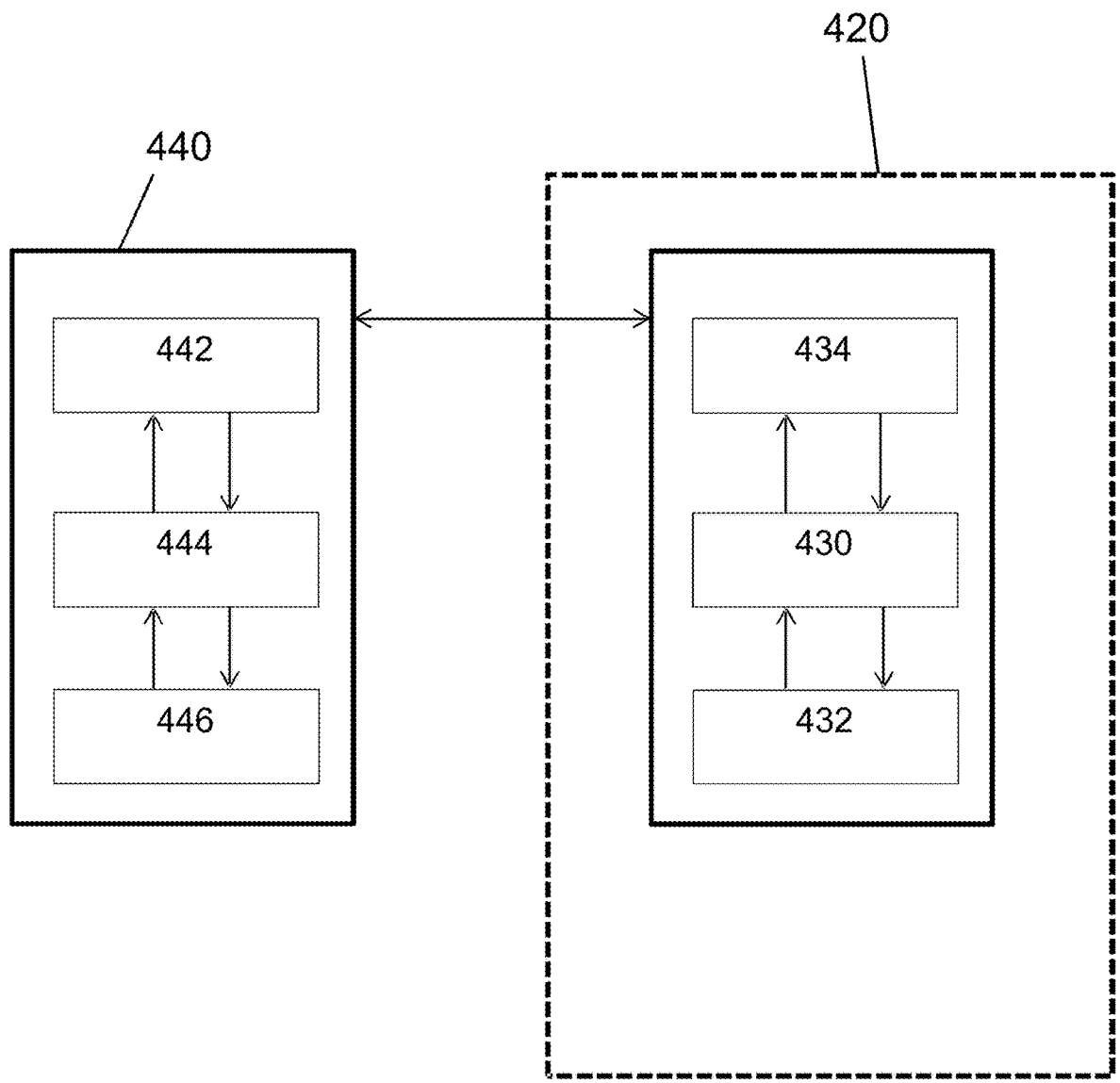
FIG. 4 illustrates a host and receiver utilizing the construction of FIG. 3.

FIG. 4 shows an example of a host 420 and a client passive device 440. In the example shown, the host 420 may be a proximity coupling device (PCD), and the client device 440 may be a proximity integrated circuit chip (PICC), such as a RFID tag or a smartcard 440 suitable for use in the key distribution protocol in accordance with the present disclosure. The host 420 in this embodiment is a computer which includes a processor 430, a memory 432 and a card interface 434. The smartcard 440 includes an input/output interface 442, a processor 444 and a memory 446. The host 420 communicates with the smartcard 440 via the card interface 434 and the input/output interface 442. The processor 444 may be a microprocessor or a finite state machine configured to provide cryptographic processing operations as described in greater detail below. The memory 446 of card 440 may be an electronic static or dynamic random access memory (RAM), a magnetic memory or other suitable arrangement of information storage elements. The card interface 434 and input/output interface 442 may be in conformance with a standard card interface such as the personal computer memory card interface adaptor (PCMCIA) standard or a contactless communication interface like ISO 14443.

In an exemplary embodiment of the disclosure as shown in FIG. 4, the card 440 is used to generate a key stream. A process operating on host 420 then provides an encrypted data input to the card for decryption. The card 440 then performs decryption using the key stream. This allows the card 440 to be implemented as a device with relatively limited computational power and low input/output bandwidth. The card 440 in this example will be assumed to operate as a stateless device, such that the current output depends only on the current input and not on any prior inputs. For a given input n, the card 440 will thus output a function with a value determined by the input n, the secret key K stored in memory 446, and a random or pseudo-random bit sequence generated in card 440. This assumption recognizes that many currently available smart cards include limited memory, processing and input/output capabilities.

Figure 5:
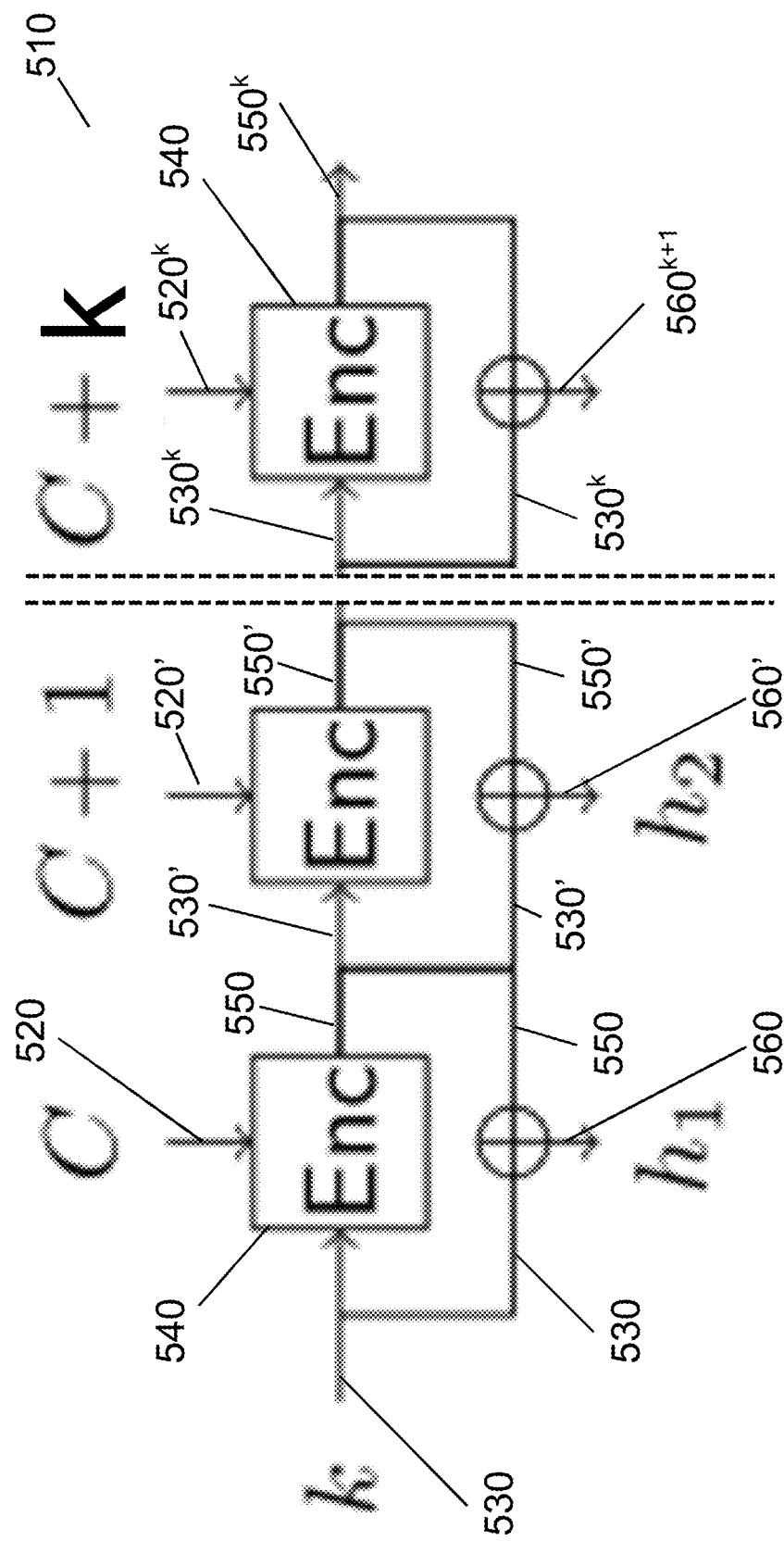
FIG. 5 illustrates possible constructions for generating secret values and keys for input into the construction of FIG. 3.

FIG. 5 shows an example of how a key and a secret value is generated. In this example construction 510, a master encryption key, $K_i$ 530 is obtained from a memory of a host cryptographic device. The master encryption key 530 is provided to an encryption module 540 having an encryption primitive, such a block cipher. The encryption module 540 can be the same encryption module as used for generating the pseudorandom output. A constant input C 520 is provided to the encryption module 540. The constant input 520 may be the value 0. The output 550 of the encryption module is equal to the encrypted output of the key 530 and the constant input 520. The output 550 is used as key 530' for the next encryption which takes the constant value 520' as a value input. 520' may for instance be the constant C incremented by 1. The output of this encryption is 550'. The XOR sum of 530 and 550 may be read as secret value $h_1$ 560. Similar the XOR sum of 530' and 550' may be read as a second secret value $h_2$ 560'. Given that the initial key 530 is secret also the encrypted constant C 520 is secret and therefore also the XOR sum of 530 and 550 is. This is repeated until k+1 secret values $560^{k+1}$ from a $k^{th}$ constant input $C+k\ 520^k$ based on a $k^{th}$ key $530^k$ are generated where the $(k+1)^{th}$ secret value $560^{k+1}$ generated from an XOR sum of $530^k$ and $550^k$ may be used as generated key 330 in FIG. 3.

Figure 6:
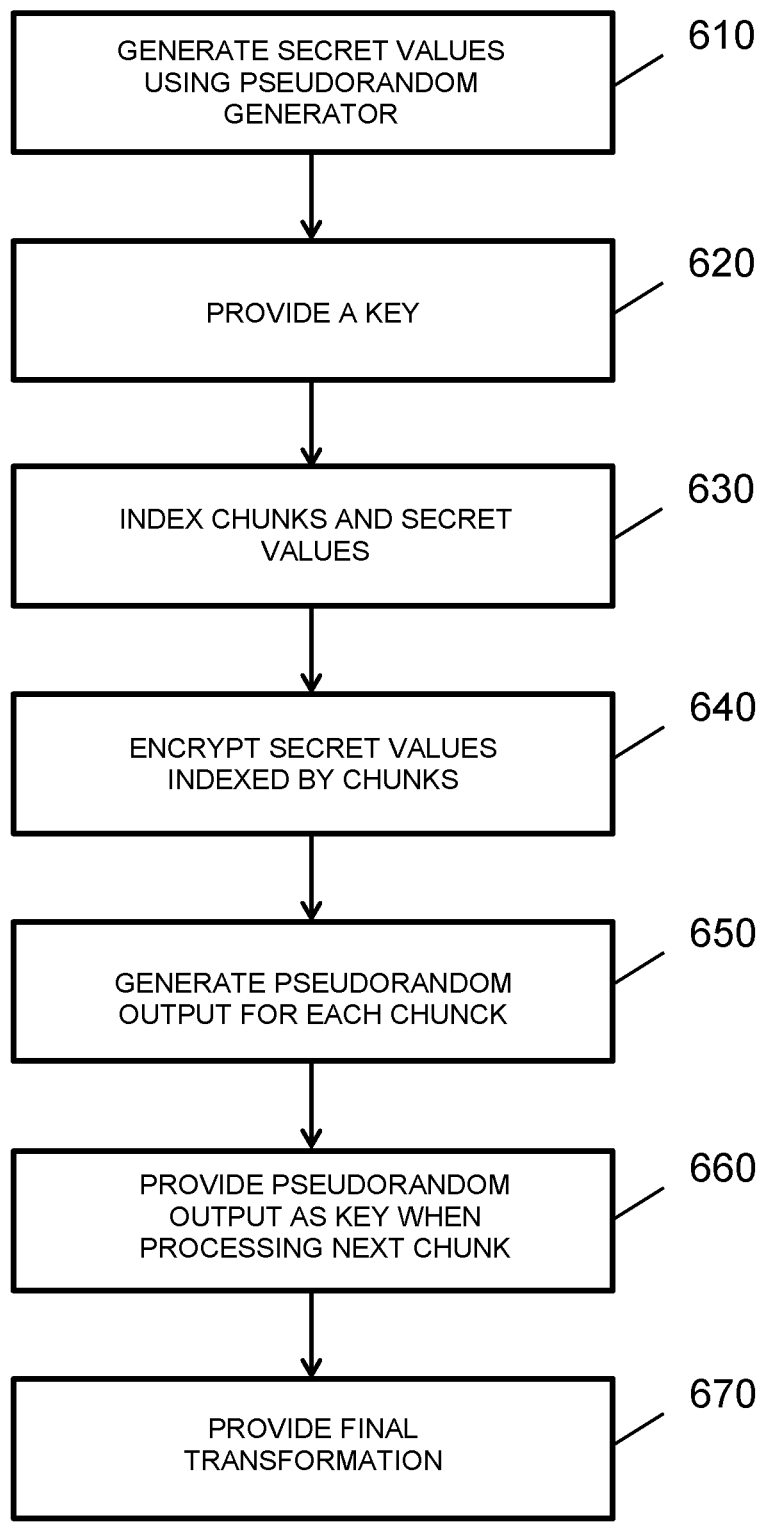
FIG. 6 is a block diagram of a method for securing a cryptographic device with an encryption module against implementation attacks according to an embodiment.

FIG. 6 is a block diagram of a method for securing a cryptographic device with an encryption module against implementation attacks. The comprises a first step 610 of generating secret values using a pseudorandom generator. A key is then provided 620, with an input having a number of chunks and the secret values to an encryption module. Indexing 630 of the chunks and the secret values then occurs before the input is processed 640 chunk wise by encrypting the secret values indexed by the chunks using the key and the encryption module. For each chunk, a pseudorandom output of the encryption module is generated 650. The pseudorandom output is then provided 660 as the key when processing the next chunk before a final transformation is performed 670 on the last pseudorandom output from the previous step 660 by using it as a key to encrypt a fixed plaintext.

Figure 7:
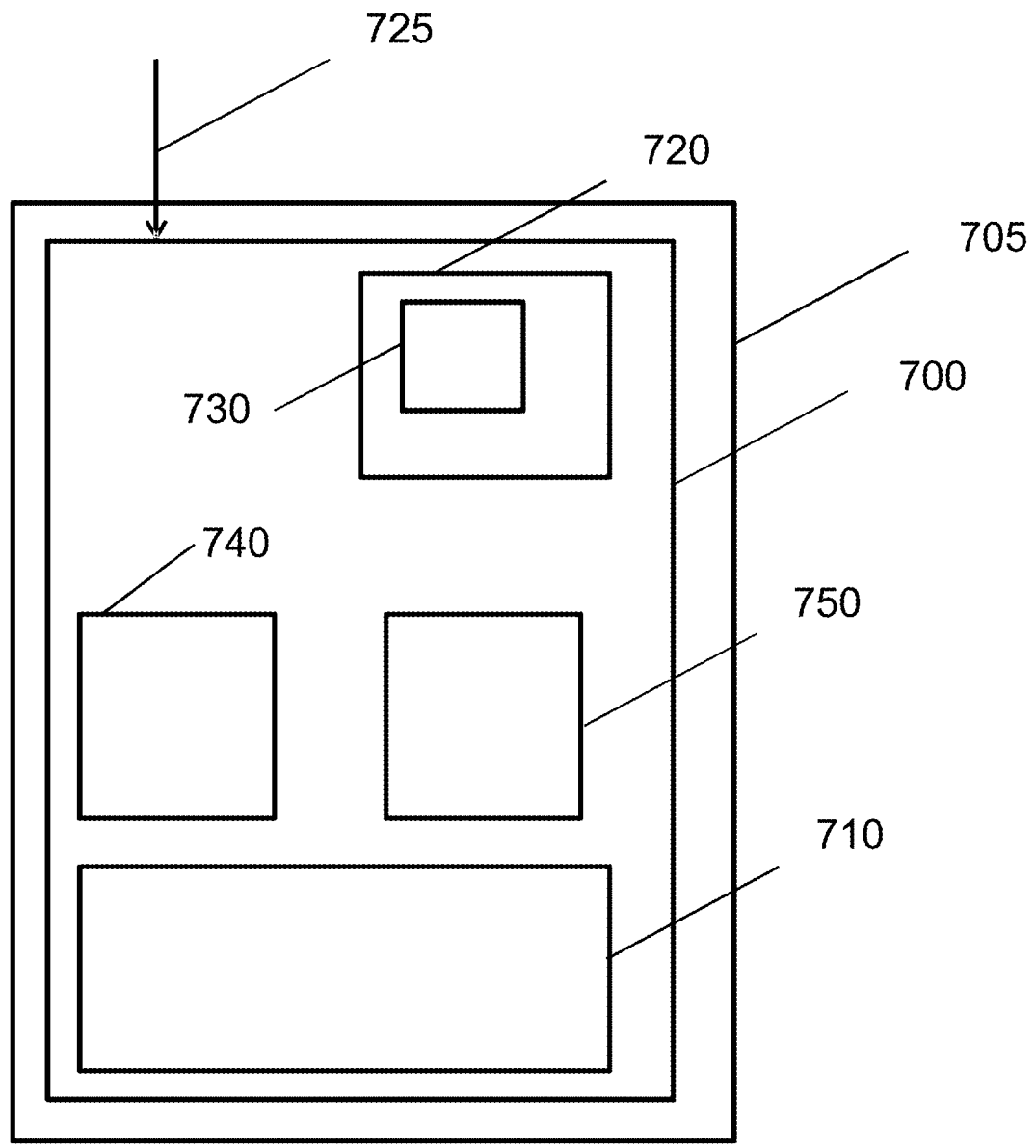
FIG. 7 is an integrated circuit according to embodiments.

FIG. 7 shows an integrated circuit 705 for a cryptographic device 700 comprising a microprocessor 710 and memory 720. The device is configured to receive a signal 725, which may be a fixed plaintext, for processing by the device 700. The device 700 comprises a key 730 stored within the memory 720. An encryption module 750 and a pseudorandom generator 740 are also provided. The integrated circuit is configured to undertake the steps outlined in FIGS. 3 to 6.

From reading the present disclosure, other variations and modifications will be apparent to the skilled person. Such variations and modifications may involve equivalent and other features which are already known in the art of cryptography and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A method for securing a cryptographic device with an encryption module against implementation attacks, the method comprising:
   generating a plurality of secret values using a pseudorandom generator;
   obtaining, in the encryption module, a master encryption key from a memory of the cryptographic device, an initialization vector having a plurality of chunks, and the plurality of secret values, wherein each chunk of the plurality of chunks in the initialization vector is used to select a respective secret value from the plurality of secret values as an input to the encryption module;
   indexing the plurality of chunks and the plurality of secret values by encrypting the plurality of secret values indexed by the plurality of chunks using the master encryption key and the encryption module;
   generating, for each chunk of the plurality of chunks, a pseudorandom output of the encryption module;
   providing the generated pseudorandom output, for each chunk of the plurality of chunks, as a subsequent key when processing a subsequent chunk; and using a last generated pseudorandom output as a final key to encrypt a fixed plaintext.

2. The method of claim 1, further comprising:
   generating the subsequent key to the encryption module, like the plurality of secret values, with the pseudorandom generator.

3. The method of claim 2, wherein each key, for each chunk of the plurality of chunks, is only used with a single secret value in the encryption module.

4. The method of claim 1, wherein, for each chunk of the plurality of chunks only unknown values for each key and the plurality of secret values to the encryption module are processed.

5. The method of claim 1, wherein the final key used is only used together with a single fixed plaintext.

6. The method of claim 1, further comprising:
   processing a first secret value indexed by a First chunk of the plurality of chunks using the master encryption key to derive a first pseudorandom output.

7. The method of claim 6, further comprising:
   deriving each subsequent key based on the first pseudorandom output; and
   processing a subsequent secret value indexed by the subsequent chunk of the plurality of chunks using each subsequent key to derive a subsequent pseudorandom output.

8. The method of claim 6, further comprising:
   deriving, for each chunk of the plurality of chunks, a $(l-1)^{th}$ subsequent key based on the $(l-1)^{th}$ pseudorandom output; and
   processing a chunk of the plurality of chunks using the $(l-1)^{th}$ subsequent key and a secret value indexed by the chunk to derive a pseudorandom output.

9. The method of claim 1, further comprising:
   i) obtaining an encryption key from the memory of the cryptographic device;
   ii) providing the encryption key and a constant input to the encryption module having an encryption primitive;
   iii) encrypting the constant input with a value of the encryption key using the encryption primitive to generate a secret intermediate value, and
   iv) combining iteratively the secret intermediate value with the encryption key to provide the plurality of secret values; and
   v) using the secret intermediate value to update the encryption key to repeat steps iii) to v).

10. The method of claim 9, wherein steps iii) to v) are repeated k+1 times to obtain a set of (k+1) number of secret values and a subsequent key, wherein the subsequent key is based on a $(k+1)^{th}$ secret value.

11. The method of claim 1, wherein the plurality of secret values are enlarged using linear combinations to obtain a larger set of secret values.

12. The method of claim 1, further comprising:
    generating each subsequent key based on the master encryption key supplied to the pseudorandom generator.

13. A system for secure communication of data, said system comprising:
    a host device with a host microprocessor and host memory, wherein the host device comprises a master key stored within the host memory and a pseudorandom generator;
    a client device with a client microprocessor and client memory, wherein the client device comprises an encryption module;
    a secure connection between the host device and the client device; and is configured to derive a pseudorandom function family from pseudorandom outputs in the encryption module with the master key and chunk-wise processing of an initialization vector and a plurality of secret values generated by the pseudorandom generator, wherein each chunk of a plurality of chunks in the initialization vector is used to select a respective secret value as an input to the encryption module, and use said pseudorandom function family for encrypting communication between the client device and the host device.

14. A system for providing authenticated communication of data, said system comprising:
    a host device with a host microprocessor and host memory wherein the host device comprises a master key stored within the host memory and a pseudorandom generator;
    a client device with a client microprocessor and client memory wherein the client device comprises an encryption module;
    an authenticated connection between the host device and the client device; wherein the client device is configured to derive a pseudorandom function family from pseudorandom outputs in the encryption module with the master key and chunk-wise processing of an initialization vector and a plurality of secret values generated by the pseudorandom generator, wherein each chunk of a plurality of chunks in the initialization vector is used to select a respective secret value as an input to the encryption module, and use said pseudorandom function family for authenticating communication between the client device and the host device by using the pseudorandom outputs as a message authentication code.

15. The system of claim 13, wherein the client device is a proximity integrated circuit chip (PICC).

16. The system of claim 13, wherein the client device is a Radio Frequency Identification (RFID) tag.

17. The system of claim 13, wherein the client device is a smart card.

18. The system of claim 14, wherein the client device is a proximity integrated circuit chip (PICC).

19. The system of claim 14, wherein the client device is a Radio Frequency Identification (RFID) tag.

20. The system of claim 14, wherein the client device is a smart card.

* * * * *